US012577167B2

(12) United States Patent
Iguchi et al.

(10) Patent No.: US 12,577,167 B2
(45) Date of Patent: Mar. 17, 2026

(54) DIELECTRIC COMPOSITION AND MULTILAYER CERAMIC ELECTRONIC DEVICE

(71) Applicant: TDK CORPORATION, Tokyo (JP)

(72) Inventors: Toshihiro Iguchi, Tokyo (JP); Yuichiro Sueda, Tokyo (JP); Ryota Namiki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 972 days.

(21) Appl. No.: 17/748,524

(22) Filed: May 19, 2022

(65) Prior Publication Data

US 2022/0380257 A1 Dec. 1, 2022

(30) Foreign Application Priority Data

May 26, 2021 (JP) ................................. 2021-088537

(51) Int. Cl.
*C04B 35/468* (2006.01)
*H01G 4/12* (2006.01)
*H01G 4/30* (2006.01)

(52) U.S. Cl.
CPC ....... *C04B 35/4682* (2013.01); *H01G 4/1227* (2013.01); *H01G 4/30* (2013.01); *C04B 2235/3224* (2013.01); *C04B 2235/3236* (2013.01); *C04B 2235/3239* (2013.01); *C04B 2235/3481* (2013.01); *C04B 2235/442* (2013.01); *C04B 2235/5436* (2013.01); *C04B 2235/5445* (2013.01);

(Continued)

(58) Field of Classification Search
None
See application file for complete search history.

(56) References Cited

U.S. PATENT DOCUMENTS

2006/0088719 A1* 4/2006 Ito ........................ H01G 4/1218
428/701
2009/0149312 A1* 6/2009 Aman ..................... C04B 35/49
501/137

(Continued)

FOREIGN PATENT DOCUMENTS

CN 104944941 A 9/2015
CN 107026014 A 8/2017

(Continued)

OTHER PUBLICATIONS

Divya et al., "Crystallization studies and dielectric properties of (Ba0.7Sr0.3)TiO3 in bariumaluminosilicate glass," J. Phys. D: Appl. Phys. 40 (2007): 7804-7810. (Year: 2007).*

(Continued)

*Primary Examiner* — Amber R Orlando
*Assistant Examiner* — Paul Alan Forsyth
(74) *Attorney, Agent, or Firm* — Oliff PLC

(57) ABSTRACT

A dielectric composition includes dielectric particles, grain boundary phases, and segregations. The dielectric particles each include a perovskite compound represented by $ABO_3$ as a main component. The grain boundary phases are located between the dielectric particles. The segregations exist in a part of the grain boundary phases and include at least Al, Si, and O. A molar ratio (Al/(Al+Si)) of an Al content to a total content of Al and Si in the segregations is 0.45 or more and 0.75 or less.

7 Claims, 2 Drawing Sheets

Figure 1:
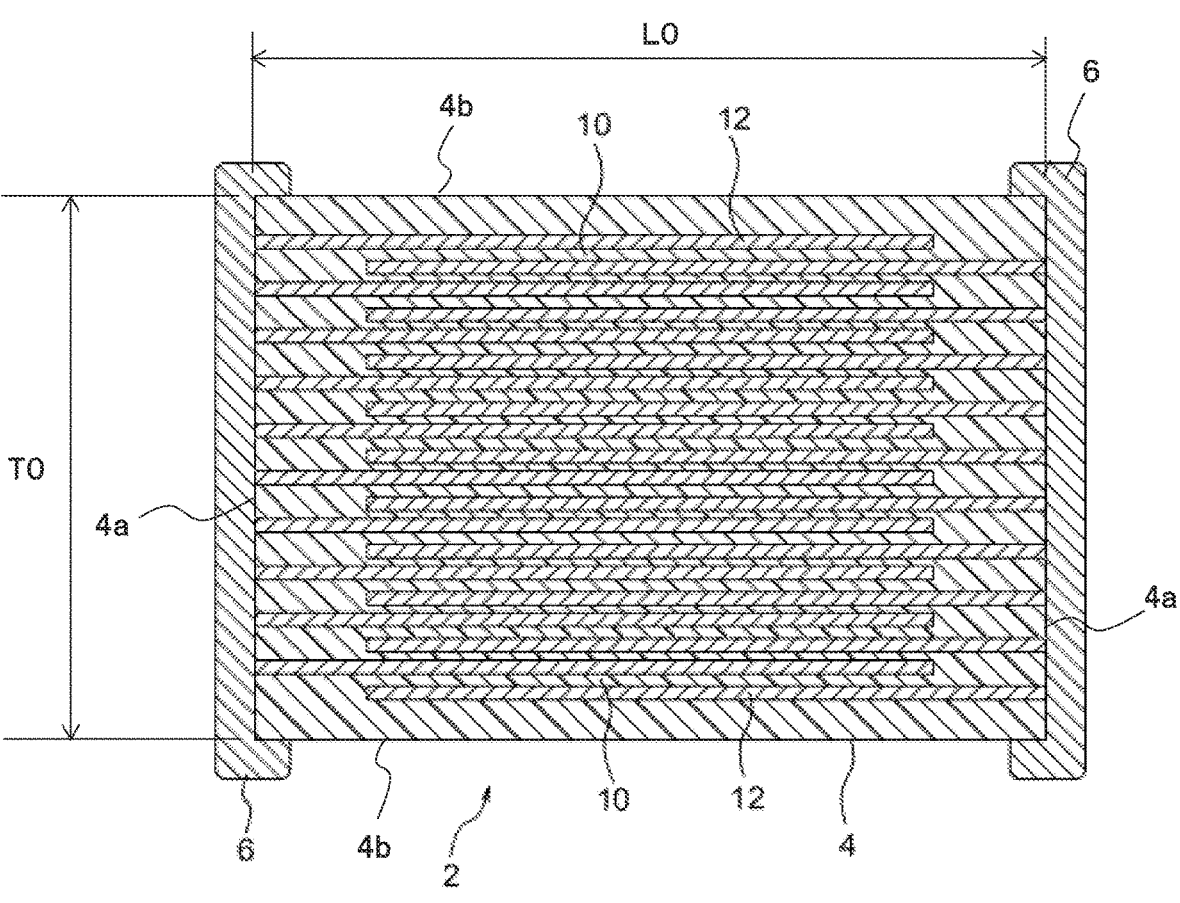
Figure 1:
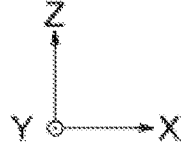

(52) U.S. Cl.
CPC     *C04B 2235/5454* (2013.01); *C04B 2235/768*
          (2013.01); *C04B 2235/85* (2013.01)

(56)                    References Cited

U.S. PATENT DOCUMENTS

| | | | |
|---|---|---|---|
| 2014/0009864 A1* | 1/2014 | Takashima .......... | C04B 35/4682 |
| | | | 361/301.4 |
| 2015/0274597 A1 | 10/2015 | Morigasaki et al. | |
| 2016/0020025 A1* | 1/2016 | Yao ................... | C04B 35/62685 |
| | | | 501/139 |
| 2017/0186536 A1 | 6/2017 | Sato et al. | |
| 2017/0186548 A1* | 6/2017 | Sato ................... | C04B 35/4682 |

FOREIGN PATENT DOCUMENTS

| | | | |
|---|---|---|---|
| CN | 112592175 A | 4/2021 | |
| JP | 2002-167274 A | 6/2002 | |
| JP | 2006-114563 A | 4/2006 | |
| JP | 2013-012418 A | 1/2013 | |
| WO | 2012/120712 A1 | 9/2012 | |

OTHER PUBLICATIONS

P V Divya et al., "Crystallization studies and dielectric properties of (Ba0.7Sr0.3)TiO3 in bariumaluminosilicate glass", Journal of Physics D: Applied Physics 40, (2007), pp. 7804-7810.

* cited by examiner

DIELECTRIC COMPOSITION AND MULTILAYER CERAMIC ELECTRONIC DEVICE

BACKGROUND OF THE INVENTION

The present invention relates to a dielectric composition and a multilayer ceramic electronic device including the dielectric composition.

As shown in Patent Document 1, a multilayer ceramic electronic device formed by alternately laminating ceramic layers composed of a dielectric composition and internal electrode layers is known. The multilayer ceramic electronic device has differences in characteristics, such as shrinkage factor and linear expansion coefficient, between the ceramic layers and the internal electrode layers. In the ceramic layers composed of a dielectric composition, structural defects, such as cracks, are likely to occur due to the differences in characteristics, and the durability in a high-temperature and high-humidity environment may decrease.

Patent Document 1: JP2013012418 (A)

BRIEF SUMMARY OF THE INVENTION

The present invention has been achieved under such circumstances. It is an object of the present invention to provide a dielectric composition and a multilayer ceramic electronic device having an excellent durability for a high-temperature and high-humidity environment.

To achieve the above object, a dielectric composition according to the present invention comprises:

dielectric particles each including a perovskite compound represented by $ABO_3$ as a main component;

grain boundary phases located between the dielectric particles; and segregations existing in a part of the grain boundary phases and including at least Al, Si, and O, wherein a molar ratio (Al/(Al+Si)) of an Al content to a total content of Al and Si in the segregations is 0.45 or more and 0.75 or less.

The dielectric composition according to the present invention has the above-mentioned characteristics and is thus considered to improve the joint strength between the dielectric particles. Even if a crack starting point is generated inside the dielectric composition, it is considered that the crack growth can be prevented by the predetermined segregations existing in the grain boundary phases. As a result, the dielectric composition according to the present invention and a multilayer ceramic electronic device including the dielectric composition can sufficiently prevent the occurrence of cracks and improve the durability for a high-temperature and high-humidity environment.

Preferably, the molar ratio (Al/(Al+Si)) in the segregations is 0.60 or more.

Preferably, the segregations further include Ba, and a Ba/Ti ratio in the segregations is larger than that in the dielectric particles.

Preferably, an average particle size of the segregations is 0.05 µm or more and 0.20 µm or less.

Preferably, an average thickness of the grain boundary phases is 0.01 µm or more and 0.15 µm or less.

Preferably, a content rate of the segregations is 0.05 pieces/µm² or more and 2.00 pieces/µm² or less.

Preferably, the perovskite compound comprises barium titanate.

BRIEF DESCRIPTION OF THE DRAWING(S)

Figure 2:
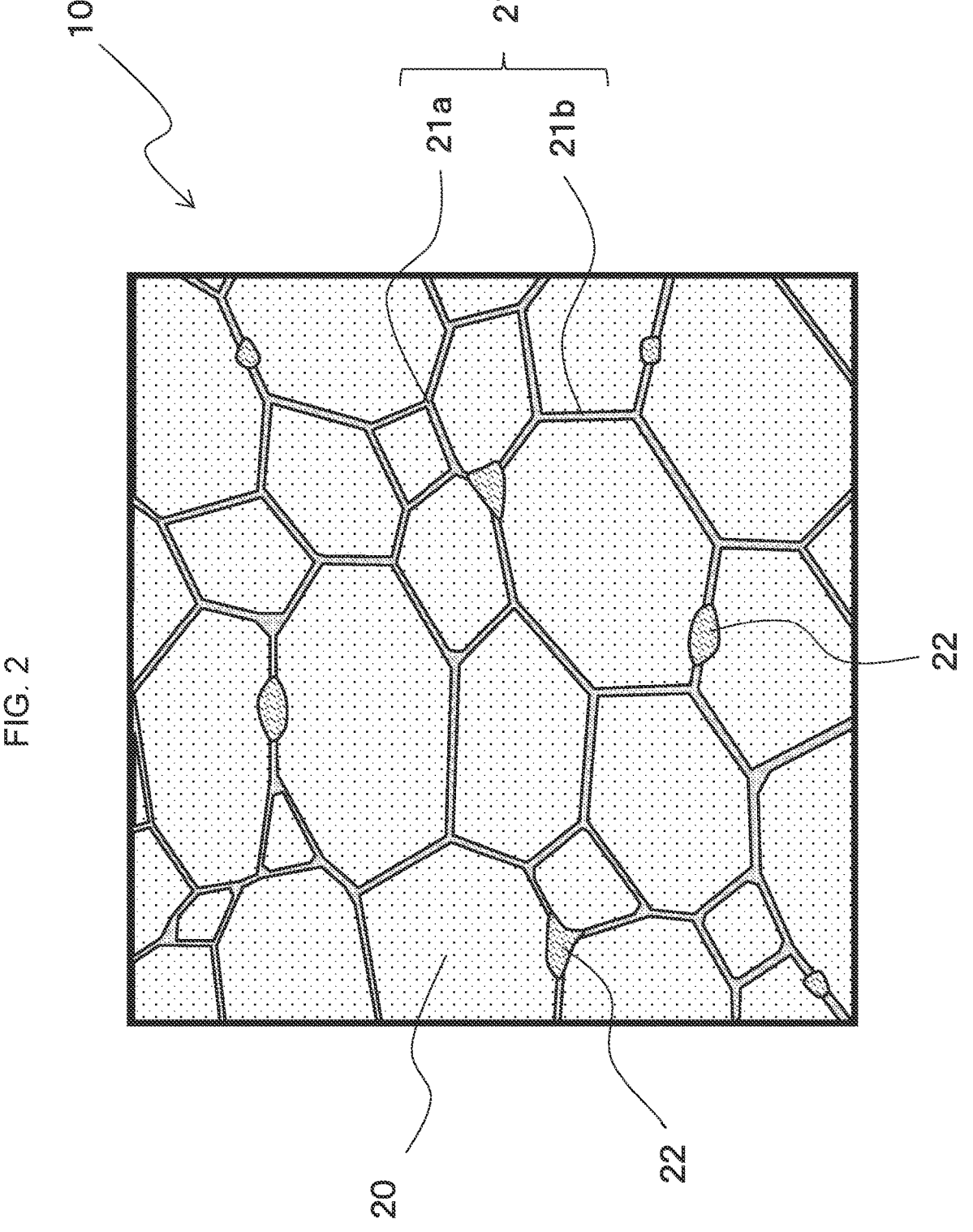

FIG. 1 is a schematic view illustrating a cross section of a multilayer ceramic capacitor according to an embodiment; and FIG. 2 is an enlarged cross-sectional view of ceramic layers 10 shown in FIG.

DETAILED DESCRIPTION OF THE INVENTION

In the present embodiment, a multilayer ceramic capacitor 2 shown in FIG. 1 is described as an example of a ceramic electronic device according to the present invention. The multilayer ceramic capacitor 2 includes an element body 4 and a pair of external electrodes 6 formed on the external surface of the element body 4.

The element body 4 shown in FIG. 1 normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction, but the element body 4 may have any other shape, such as elliptical columnar shape, columnar shape, and prismatic shape. The element body 4 has any outer size and can have, for example, a length L0 of 0.4-5.7 mm in the X-axis direction, a width W0 of 0.2-5.0 mm in the Y-axis direction, and a height T0 of 0.2-3.0 mm in the Z-axis direction. In the present embodiment, the X-axis, the Y-axis, and the Z-axis are perpendicular to each other.

The element body 4 includes ceramic layers 10 and internal electrode layers 12 substantially parallel to the plane including the X-axis and the Y-axis. In the inside of the element body 4, the ceramic layers 10 and the internal electrode layers 12 are laminated alternately along the Z-axis direction. Here, "substantially parallel" means that most parts are parallel, but there may be a part that is not slightly parallel, and the ceramic layers 10 and the internal electrode layers 12 may slightly be uneven or inclined.

The ceramic layers 10 are made of a dielectric composition mentioned below. The average thickness (interlayer thickness) per layer of the ceramic layers 10 is not limited and can be, for example, 100 µm or less (preferably, 30 µm or less). The lamination number of ceramic layers 10 is determined based on desired characteristics and is not limited. For example, the lamination number of ceramic layers 10 can be 20 or more, preferably 50 or more.

Meanwhile, the internal electrode layers 12 are laminated between the ceramic layers 10 and the lamination number of internal electrode layers 12 is determined based on the lamination number of ceramic layers 10. The average thickness per layer of the internal electrode layers 12 is not limited and can be, for example, 3.0 µm or less. The average thickness of the ceramic layers 10 and the average thickness of the internal electrode layers 12 are calculated by observing a cross section as shown in FIG. 1 using a metallurgical microscope and measuring the thickness of each layer (10, 12) at five points or more.

The internal electrode layers 12 are laminated so that their ends on one side are alternately exposed to two end surfaces 4*a* of the element body 4 facing each other in the X-axis direction. Then, the pair of external electrodes 6 is formed on the end surfaces 4*a* of the element body 4 and electrically connected to the exposed ends of the internal electrode layers 12 alternately arranged. Since the internal electrode layers 12 and the external electrodes 6 are formed in such a manner, a capacitor circuit is formed by the external electrodes 6 and the internal electrode layers 12. That is, the ceramic layers 10 existing in the capacitance region are sandwiched by the internal electrode layers 12 having different polarities, and voltage can be applied to the ceramic layers 10.

The internal electrode layers 12 are made of a conductive material and preferably include Ni as a main component. Specifically, preferably, the conductive material of the internal electrode layers 12 is pure Ni or a Ni based alloy containing Ni by 85 wt % or more. The Ni based alloy may include one or more elements selected from Mn, Cu, Cr, etc. In addition to the conductive material, as an inhibitor, the internal electrode layers 12 may contain particles of a perovskite compound having the same composition as the main component of the ceramic layers 10. In addition, the internal electrode layers 12 may contain a trace amount (e.g., about 0.1 mass % or less) of non-metal elements, such as S and P, and may contain voids. When the internal electrode layers 12 contain an inhibitor, voids, or the like, the internal electrode layers 12 may have disconnected parts where an electrode (conductive material) is not present.

The pair of external electrodes 6 can include a baked electrode layer, a resin electrode layer, a plating electrode layer, or the like and may be composed of a single electrode layer or a plurality of laminated electrode layers. For example, the external electrode 6 can have a triple-layer structure of a baked electrode layer—a Ni plating layer—a Sn plating layer (laminated in this order). In this case, the Sn plating layer is located on the outermost surface of the external electrode 6, and the solder wettability of the external electrode 6 is thus favorable.

As shown in FIG. 1, each of the external electrodes 6 integrally includes an end surface part formed on the end surface 4*a* of the element body 4 and extension parts formed at an end in the X-axis direction on each of the side surfaces 4*b* of the element body 4. That is, each of the external electrodes 6 is formed so as to range from the end surface 4*a* to the side surfaces 4*b* of the element body 4. The external electrodes 6 are insulated so as not to contact with each other in the X-axis direction.

Note that, the extension parts of the external electrodes 6 are not necessarily formed, and each of the external electrodes 6 may be formed from only the end surface part. Instead, when the multilayer ceramic capacitor 2 is surface-mounted on a substrate, the extension parts of the external electrodes 6 are formed at least on the side surface 4*b* facing a mounting surface of the substrate and are not necessarily formed on the side surface 4*b* opposite to the mounting surface.

Next, a dielectric composition of the ceramic layers 10 is explained in detail.

The dielectric composition of the ceramic layers 10 includes a perovskite compound represented by a general formula of $ABO_3$ as a main component. Here, the main component of the ceramic layers 10 (the main component of the dielectric composition) means a component occupying 80 mol % or more of the ceramic layers 10. In the present embodiment, the perovskite compound (main component) is preferably barium titanate (BT). This barium titanate may be represented by a composition formula of $(Ba_{(1-a-b)} Sr_a Ca_b)_m (Ti_{(1-c-d)} Zr_c Hf_d)O_3$.

In the composition formula, each of a, b, c, d, and m is an elemental ratio, and each elemental ratio is not limited and can be determined within a known range. For example, "m" indicates an elemental ratio of the A-site to the B-site and can normally be 1.0-1.1. "a" indicates an elemental ratio of Sr in the A-site, and "b" indicates an elemental ratio of Ca in the A-site. In the present embodiment, $0 \leq a+b \leq 0.1$ is preferably satisfied. "c" indicates an elemental ratio of Zr in the B-site, and "d" indicates an elemental ratio of Hf in the B-site. In the present embodiment, $0 \leq c+d \leq 0.15$ is preferably satisfied. The elemental ratio of oxygen (O) in the above-mentioned composition formula may slightly deviate from the stoichiometric composition.

In addition to the above-mentioned main component, the ceramic layers 10 may include sub-components, such as Mn compounds, Mg compounds, Cr compounds, Ni compounds, rare earth element compounds, Si compounds, Li compounds, B compounds, V compounds, Al compounds, and Ca compounds. There is no limit to the type, combination, or addition amount of the sub-components.

The component composition of the ceramic layers 10 is analyzed by inductively coupled plasma emission spectroscopy (ICP), laser ablation ICP mass analysis (LA-ICP-MS), fluorescent X-ray analysis (XRF), energy dispersive X-ray analysis (EDX), electron beam microanalyzer (EPMA) equipped with wavelength dispersive X-ray spectroscope (WDS), or the like.

The ceramic layers 10 containing the above-mentioned components have an internal texture as shown in FIG. 2 and include dielectric particles 20 (parent phases), grain boundary phases 21 located between the dielectric particles 20, and segregations 22 existing in a part of the grain boundary phases 21.

The dielectric particles 20 are composed of the main component (perovskite compound) of the ceramic layers 10 mentioned above. In addition to the main component, when the ceramic layers 10 include sub-components, the sub-components may be solid-soluted in the dielectric particles 20. The dielectric particles 20 may have a core-shell structure by solid solution of the sub-components. The dielectric particles 20 can have an average particle size of 2 μm or less and preferably have an average particle size of 0.20 μm to 1.00 μm.

An average particle size of the dielectric particles 20 can be measured by observing a cross section of the ceramic layers 10 as shown in FIG. 2 using a scanning electron microscope (SEM), a scanning transmission electron microscope (STEM), or the like and performing an image analysis of the obtained cross-sectional photograph. For example, an average particle size of the dielectric particles 20 is calculated by measuring equivalent circle diameters of at least five or more dielectric particles 20.

The grain boundary phases 21 existing between the dielectric particles 20 include constituent elements of the main component and sub-component elements. Then, the grain boundary phases 21 are made of grain boundary multipoints 21a and two-particle grain boundaries 21b. The grain boundary multipoints 21a are grain boundaries surrounded by at least three dielectric particles 20, and the two-particle grain boundaries 21b are grain boundaries located between two adjacent dielectric particles 20. In the present embodiment, preferably, the two-particle grain boundaries 21b have an average thickness of 0.01 μm or more and 0.15 μm or less. The thickness of the two-particle grain boundaries 21b is measured by observing a cross section of the ceramic layers 10 at a high magnification of 100,000 times or more using STEM or TEM. Preferably, the thickness of the two-particle grain boundaries 21b is measured at five or more points and their average is obtained.

As shown in FIG. 2, the segregations 22 exist in a part of the grain boundary multipoints 21a and/or in a part of the two-particle grain boundaries 21b. The segregations 22 are phases of a composite oxide whose total content of Al and Si is higher than that in the dielectric particles 20 and include at least Al, Si, and O (oxygen). In addition to Al and Si, the segregations 22 may include constituent elements (Ba, Sr, Ca, Ti, Zr, Hf, etc.) of the main component, sub-component elements, and the like. In particular, preferably, the segregations 22 include Ba.

The segregations 22 have a predetermined element proportion. In the segregations 22, specifically, a molar ratio MR of an Al content to a total content of Al and Si (i.e., $Al/(Al+Si)$) is 0.45 or more and 0.75 or less and is preferably 0.60 or more and 0.75 or less. When the segregations 22 satisfying this molar ratio MR exist in a part of the grain boundary phases 21, it is considered to be possible to increase the joint strength between the dielectric particles 20 next to each other. Even if a crack origin occurs in the ceramic layers 10, it is considered that the crack growth can be prevented by the segregations 22 existing in the grain boundary phases 21. As a result, the occurrence of cracks in the ceramic layers 10 can be prevented, and the multilayer ceramic capacitor 2 according to the present embodiment exhibits an excellent durability for a high-temperature and high-humidity environment.

When the segregations 22 are subjected to component analysis, the constituent elements of the dielectric particles 20 may also be detected. Assuming that the total content of elements excluding oxygen contained in the segregations 22 is 100 mol, the sum of the Al content and the Si content is preferably at least 20 mol % or more. Moreover, when the segregations 22 contain Ba, a molar ratio of Ba to Ti in the segregations 22 (hereinafter, referred to as a Ba/Ti ratio) is preferably higher than a Ba/Ti ratio in the dielectric particles 20. Specifically, the Ba/Ti ratio in the dielectric particles 20 is about 1.1 or less, whereas the Ba/Ti ratio in the segregations 22 is preferably 1.20 or more and has no upper limit.

As mentioned above, Ba is a constituent element of the main component of the dielectric particles 20, and the inclusion of Ba in the segregations 22 is considered to further improve the joint strength between the dielectric particles 20 next to each other. As a result, cracks in the ceramic layers 10 can be prevented more effectively, and the durability for a high-temperature and high-humidity environment can further be improved.

The detailed composition of the segregations 22 is not limited, but the crystal system of the segregations 22 is preferably a hexagonal system. Examples of the hexagonal composite oxide include $BaAl_2Si_2O_8$. When the segregations 22 are a hexagonal composite oxide as mentioned above, the durability for a high-temperature and high-humidity environment can be further improved.

In the present embodiment, the segregations 22 are preferably determined by a combination of mapping analysis and point analysis with EDX or WDS. For example, in a cross section of the element body 4 as shown in FIG. 2, a mapping analysis is performed to determine regions where Al is segregated from an Al mapping image. Here, the "regions where Al is segregated" means regions whose Al concentration is higher than that in the dielectric particles 20 and can be visually determined from the Al mapping image. After determining the regions where Al is segregated, a point analysis is performed in each of the regions so as to measure a molar ratio MR in each of the regions. Then, if the measured molar ratio MR is in the range of 0.45 to 0.75, the determined regions are considered to be the segregations 22 according to the present embodiment. The measurement conditions, such as measurement visual field and resolution, in the mapping analysis and the point analysis are not limited and appropriately determined so that segregation analysis can be performed.

The segregations 22 can have an average particle size of 0.35 μm or less and preferably have an average particle size of 0.05 μm or more and 0.20 μm or less. The average particle size is determined in consideration of the average thickness of the grain boundary phases 21. When the segregations 22 have an average particle size within the above-mentioned range, cracks in the ceramic layers 10 can be prevented more effectively. The average particle size of the segregations 22 is calculated by determining at least five segregations 22 with EDX or WDS and thereafter measuring equivalent circle diameters of the determined segregations 22 with image analysis.

In the present embodiment, the number N (unit: pieces/$\mu m^2$) of segregations 22 contained in a unit cross-sectional area of the ceramic layers 10 is defined as the content rate of the segregations 22 in the ceramic layers 10. The number N can be in the range of 0.01 pieces/$\mu m^2$ to 3.5 pieces/$\mu m^2$ and is preferably 0.05 pieces/$\mu m^2$ or more. Considering the influence of the segregations 22 on the relative permittivity, the number N is preferably 2.00 pieces/$\mu m^2$ or less. When the number N is in the range of 0.05 to 2.00 pieces/$\mu m^2$, the improvement in the durability for a high-temperature and high-humidity environment and a high relative permittivity can be achieved at the same time. The number N is calculated by observing a cross section of the ceramic layers 10 as shown in FIG. 2 in a plurality of visual fields with SEM or STEM and measuring the number of segregations 22 existing in the cross section of at least 10 $\mu m^2$ or more in total.

7
8

In addition to the segregations 22 mentioned above, the grain boundary phases 21 may include other segregations due to sub-components. Examples of other segregations include segregations containing Si without Al and segregations containing rare earth elements. In addition to the dielectric particles 20 and the segregations 22 mentioned above, voids and sub-phase particles may exist in the ceramic layers 10.

Next, a method of manufacturing the multilayer ceramic capacitor 2 shown in FIG. 1 is explained.

First, a manufacturing process of the element body 4 is explained. In the manufacturing process of the element body 4, a dielectric paste to be the ceramic layers 10 after firing and an internal-electrode paste to be the internal electrode layers 12 after firing are prepared.

The dielectric paste is produced by using a powder of a perovskite compound, which is a main component of a dielectric composition (hereinafter, referred to as a main component powder), and a segregation powder to be the segregations 22 after firing. The main component powder is obtained by uniformly mixing starting raw materials of $BaCO_3$ powder, $TiO_2$ powder, and the like, for example, in a wet mixing manner and thereafter performing a calcining treatment. The calcined main component powder may be appropriately pulverized, classified, or the like. As with the main component powder, the segregation powder is also obtained by mixing $Al_2O_3$ powder, $SiO_2$ powder, and the like ($BaCO_3$ powder is also added when Ba is contained in the segregations 22) at a predetermined proportion and performing a calcining treatment. Preferably, the segregation powder is also appropriately pulverized so as to adjust the particle sizes of the segregations 22.

Next, the main component powder and the segregation powder are added to an organic vehicle and kneaded to obtain the dielectric paste. Here, the organic vehicle is a binder dissolved in an organic solvent. The binder to be used is not limited and is appropriately selected from various binders of polyvinyl butyral, acrylic, ethyl cellulose, and the like. The organic solvent to be used is not limited and is appropriately selected from various organic solvents of methyl ethyl ketone, methanol, ethanol, acetone, toluene, terpineol, butyl carbitol, and the like.

The above-mentioned dielectric paste is an organic paint, but the dielectric paste may be a water based paint obtained by kneading a mixed powder and a water based vehicle. In this case, the water based vehicle is produced by dissolving a water-soluble binder, a dispersant, and the like in water. The water-soluble binder to be used is not limited and can be, for example, polyvinyl alcohol, water-soluble acrylic resin, water-soluble polyvinyl butyral resin, or the like. If necessary, the dielectric paste may contain additives selected from various dispersants, plasticizers, dielectrics, sub-component compounds, and glass frits.

Meanwhile, an internal-electrode paste is produced by kneading a conductive material, such as pure Ni powder and Ni alloy powder, or a compound to be the above-mentioned Ni or Ni alloys after main firing, such as various oxides, organometallic compounds, and resinate, along with the organic vehicle as mentioned above. At this time, as an inhibitor, the main component powder contained in the dielectric paste may be added to the internal-electrode paste.

The inhibitor exhibits a reduction effect on the sintering of the conductive powder in the firing step.

Next, the dielectric paste is turned into sheets by, for example, a doctor blade method to obtain ceramic green sheets. Then, the internal-electrode paste is applied onto the ceramic green sheets in a predetermined pattern by various printing methods, such as screen printing, or a transfer method. Moreover, the green sheets with the internal electrode patterns are laminated and thereafter pressed in the lamination direction to obtain a mother laminated body. At this time, the ceramic green sheets and the internal electrode patterns are laminated so that the ceramic green sheets are located on the upper surface and the lower surface of the mother laminated body in the lamination direction.

The mother laminated body obtained by the above-mentioned process is cut into a predetermined size by dicing or push-cutting to obtain a plurality of green chips. If necessary, the green chips may be solidified and dried so as to remove the plasticizer and the like and may be subjected to a barrel polishing using a horizontal centrifugal barrel machine or the like after the solidification and drying. In the barrel polishing, the green chips are put into a barrel container together with a medium and a polishing liquid, and a rotational movement or vibration is applied to the barrel container. Due to this barrel polishing, unnecessary parts, such as burrs, generated during the cutting are polished, and the corners of the green chips become rounded (corner R). The green chips after the barrel polishing are washed with a cleaning solution, such as water, and dried.

Next, the green chips obtained above are subjected to a binder removal treatment, a firing treatment, and a reoxidation treatment to obtain the element body 4.

The conditions for the binder removal treatment are not limited and are appropriately determined based on the main component composition of the ceramic layers 10 and the main component composition of the internal electrode layers 12. For example, the heating rate is preferably 5-300° C./hour, the holding temperature is preferably 180-400° C., and the temperature holding time is preferably 0.5-24 hours. The binder removal atmosphere is the air or a reducing atmosphere.

After the binder removal treatment, the green chips are fired (main firing). In the firing treatment, preferably, the heating rate is 50-500° C./hour, the holding temperature is 1250° C. or more and 1350° C. or less, and the holding time is 0.5-8 hours. Preferably, the firing atmosphere is a reducing atmosphere. As the atmospheric gas, for example, a mixed gas of $N_2$ and $H_2$ can be humidified and used. Preferably, the oxygen partial pressure in the firing atmosphere is $1.0 \times 10^{-14}$ to $10^{-10}$ MPa.

In order to form the segregations 22 in the grain boundary phases 21, the green chips are heated at a high temperature as mentioned above and thereafter gradually cooled at a cooling rate of 5-100° C./hour. Then, the green chips are gradually cooled to 700° C. or less, heated again, and held at 950-1150° C. for 0.5-8 hours so as to subject the element body 4 to a reoxidation treatment. In this reoxidation treatment, a humidified $N_2$ gas or the like is preferably used as the atmospheric gas, and the oxygen partial pressure in the annealing atmosphere is preferably $1.0 \times 10^{-9}$ to $1.0 \times 10^{-5}$ MPa. For example, a wetter is used to humidify the atmospheric gas. In this case, the water temperature is preferably about 5-75° C. Preferably, the heating rate and the cooling rate in the reoxidation treatment is 50-500° C./hour.

As mentioned above, since the green chips are fired at a high temperature, gradually cooled, and heated again (reoxidation treatment) with predetermined conditions, it is considered that the segregations 22 are formed in a part of the grain boundary phases 21, and that adjacent dielectric particles are strongly sintered (jointed).

Next, a pair of external electrodes 6 is formed on the outer surface of the element body 4 obtained above. The external electrodes 6 are formed by any method. For example, when baked electrodes are formed as the external electrodes 6, a conductive paste containing glass frits is applied to the end surfaces of the element body 4 by a dip method, and the element body 4 is thereafter heated at a predetermined temperature. When resin electrodes are formed as the external electrodes 6, a conductive paste containing a thermosetting resin is applied to the end surfaces of the element body 4, and the element body 4 is thereafter heated at a temperature at which the thermosetting resin is cured. After the baked electrodes or the resin electrodes are formed in the above-mentioned manner, sputtering, vapor deposition, electrolytic plating, electroless plating, or the like may be performed so as to form the external electrodes 6 having a multilayer structure.

After the above-mentioned process, the multilayer ceramic capacitor 2 including the external electrodes 6 is obtained.

Summary of Embodiment

The multilayer ceramic capacitor 2 according to the present embodiment includes the element body 4 formed by alternately laminating the ceramic layers 10 composed of a predetermined dielectric composition and the internal electrode layers 12. Then, the dielectric composition of the ceramic layers 10 includes: the dielectric particles 20 containing the perovskite compound as a main component; the grain boundary phases 21 located between the dielectric particles 20; and the segregations 22a existing in a part of the grain boundary phases 21. The segregations 22 include at least Al, Si, and O and have a molar ratio MR of 0.45 or more and 0.75 or less.

Since the multilayer ceramic capacitor 2 has the above-mentioned characteristics, the insulation resistance is less likely to decrease in a high-temperature and high-humidity environment, and the durability for a high-temperature and high-humidity environment is improved. The reason why the durability is improved is not necessarily clear, but it is considered that the improvement in durability is due to the improvement in joint strength between the dielectric particles by the segregations 22 containing predetermined elements.

Generally, material characteristics, such as shrinkage factor and linear expansion coefficient, are different from each other between ceramic layers composed of dielectric ceramics and internal electrode layers composed Ni, and stress is generated inside the ceramic layers due to the difference in the characteristics. Thus, if a load, such as external force and thermal effect, is applied to the element body, cracks are considered to occur inside the ceramic layers and cause deterioration in insulation characteristics and durability. In the multilayer ceramic capacitor 2 according to the present embodiment, the segregations 22 existing in the grain boundary phases 21 are considered to make it easier to cause mutual diffusion of constituent elements between adjacent dielectric particles and improve the joint strength between the dielectric particles. Even if a crack starting point is generated inside the ceramic layers 10, it is considered that the crack growth can be prevented by the segregations 22 located in the grain boundary phases 21. As a result, the occurrence of cracks in the ceramic layers 10 can be prevented, and the multilayer ceramic capacitor 2 according to the present embodiment exhibits an excellent durability for a high-temperature and high-humidity environment.

In particular, the inclusion of Ba in the segregations 22 is considered to further improve the joint strength between the dielectric particles and can further improve the durability for a high-temperature and high-humidity environment.

Hereinbefore, an embodiment of the present invention is explained, but the present invention is not limited to the above-mentioned embodiment and can be modified variously without departing from the gist of the present invention.

In the present embodiment, for example, the multilayer ceramic capacitor 2 is exemplified as the multilayer ceramic electronic device, but the multilayer ceramic electronic device of the present invention may be, for example, band-pass filters, multilayer three-terminal filters, piezoelectric elements, thermistors, varistors, or the like.

In the present embodiment, the ceramic layers 10 and the internal electrode layers 12 are laminated in the Z-axis direction, but the lamination direction may be the X-axis direction or the Y-axis direction. In that case, the external electrodes 6 are formed according to the exposed surfaces of the internal electrode layers 12. The internal electrode layers 12 may be drawn out to the outer surface of the element body 4 via through-hole electrodes. In this case, the through-hole electrodes and the external electrodes 6 are electrically connected to each other.

EXAMPLES

Hereinafter, the present invention is explained in more detail with examples of the present invention, but the present invention is not limited to the examples.

Experiment 1

In Experiment 1, capacitor samples according to Examples 1-5 were manufactured in the following manner.

Examples 1-5

First, a main component powder (a raw material of a dielectric paste) and a segregation powder were prepared. Specifically, the main component powder according to Examples 1-5 was a barium titanate powder (BaTiO$_3$ powder) obtained by hydrothermal synthesis. In Examples 1 and 2, an Al—Si—O based composite oxide powder was prepared as the segregation powder. In Examples 3-5, a Ba—Al—Si—O based composite oxide powder was prepared as the segregation powder. The segregation powders were obtained by mixing raw material powders of $Al_2O_3$ powder, $SiO_2$ powder, $BaCO_3$ powder, and the like in wet manner at a predetermined proportion, calcining the mixture, and pulverizing it in a ball mill. In Examples 1-5, the raw materials were mixed at different blending proportions, and the molar ratio MR of segregations 22 was adjusted by the blending proportion of the raw materials.

Next, the main component powder, the segregation powder, an organic vehicle, and sub-component powders ($MgCO_3$ powder, $Al_2O_3$ powder, $SiO_2$ powder, $CaCO_3$ powder, $V_2O_5$ powder, $MnCO_3$ powder, and $Dy_2O_3$ powder) were kneaded to obtain a dielectric paste. Moreover, a Ni powder, a barium titanate powder (inhibitor), and an organic vehicle were kneaded to obtain an internal-electrode paste.

Next, green chips were manufactured by a sheet method using the dielectric paste and the internal-electrode paste mentioned above. Then, the green chips were subjected to a binder removal treatment, a firing treatment, and a reoxidation treatment to obtain an element body 4.

Specifically, the conditions for the binder removal treatment were heating rate: 50° C./hour, holding temperature: 250° C., temperature holding time: 10 hours, and atmosphere: air.

The conditions for the firing treatment were heating rate: 200° C./hour, holding temperature: 1270° C., holding time: 2 hours, atmospheric gas: humidified $N_2+H_2$ mixed gas, oxygen partial pressure: $1.0\times10^{-12}$ MPa, and cooling rate to 500° C.: 50° C./hour.

The element body 4 was fired with the above-mentioned conditions, gradually cooled to 500° C., and subjected to a reoxidation treatment. The conditions for the reoxidation treatment were heating rate: 200° C./hour, holding temperature: 1050° C., holding time: 2 hours, atmospheric gas: humidified $N_2$ gas, oxygen partial pressure: $1.0\times10^{-7}$ MPa, and cooling rate: 200° C./hour.

The size of the element body 4 obtained in the above-mentioned process was L0×W0×T0=2.0 mm×1.25 mm×1.25 mm. In the element body 4, the lamination number of ceramic layers 10 sandwiched by the internal electrode layers 12 was 80, the average thickness of the ceramic layers 10 was 10 μm, and the average thickness of the internal electrode layers 12 was 1.5 μm.

Next, a baked electrode layer containing Cu, a Ni plating layer, a Sn plating layer were formed in this order on the outer surface of the element body 4 mentioned above. After the above-mentioned process, the capacitor samples according to Examples 1-5 were obtained.

In Experiment 1, capacitor samples according to Comparative Examples 1-6 were obtained in the following manner.

Comparative Example 1

In Comparative Example 1, a dielectric paste was prepared without using a segregation raw material powder. That is, the dielectric paste according to Comparative Example 1 was prepared by mixing a main component powder (barium titanate powder), a sub-component powder (the same sub-component as in Example 1), and an organic vehicle. Except for the above, the experimental conditions according to Comparative Example 1 were the same as those in Example 1, and capacitor samples according to Comparative Example 1 were obtained.

Comparative Example 2

In Comparative Example 2, a dielectric paste was obtained by mixing a main component powder (barium titanate powder), an $Al_2O_3$ powder, a sub-component powder (the same sub-component as in Example 1), and an organic vehicle. That is, in Comparative Example 2, the dielectric paste was prepared using the $Al_2O_3$ powder instead of a segregation powder. Except for the above, the experimental conditions according to Comparative Example 2 were the same as those in Example 1, and capacitor samples according to Comparative Example 2 were obtained.

Comparative Example 3

In Comparative Example 3, a dielectric paste was obtained by mixing a main component powder (barium titanate powder), a $SiO_2$ powder, a sub-component powder (the same sub-component as in Example 1), and an organic vehicle. That is, in Comparative Example 3, the dielectric paste was prepared using the $SiO_2$ powder instead of a segregation powder. Except for the above, the experimental conditions according to Comparative Example 3 were the same as those in Example 1, and capacitor samples according to Comparative Example 3 were obtained.

Comparative Examples 4-6

In Comparative Examples 4-6, a composite oxide powder whose MR ratio was different from that in Examples 1-5 was prepared, and a dielectric paste was prepared using the composite oxide powder. Except for the above, the experimental conditions according to Comparative Examples 4-6 were the same as those in Example 1, and capacitor samples according to Comparative Examples 4-6 were obtained.

The capacitor samples according to each Example and each Comparative Example manufactured in Experiment 1 were subjected to the following evaluations.

Analysis of Segregations

In Experiment 1, segregations existing in the grain boundary phases 21 were determined by observing a cross section of each capacitor sample with STEM and performing a mapping analysis and a point analysis with WDS at that time. Table 1 shows the measurement results in each Example and each Comparative Example. The molar ratio MR shown in Table 1 is a ratio of an Al content to a total content of Al and Si.

Durability Evaluation

A pressure cooker bias test (PCBT) was performed so as to evaluate the durability of the capacitor samples for a high-temperature and high-humidity environment. Specifically, the capacitor samples were exposed for a long time to an environment of temperature: 121° C., humidity: 95%, and atmospheric pressure: $2.026\times10^5$ Pa while voltage (100V) was being applied to the capacitor samples. The exposure time was 24 hours in Condition 1 and 240 hours in Condition 2 for evaluation of the durability under stricter conditions than Condition 1. Then, an insulation resistance of the capacitor samples was measured before and after the PCBT, and the sample in which the insulation resistance after the PCBT was reduced to $\frac{1}{10}$ or less of the insulation resistance before the test was considered to be failed (NG). The number of test samples in Condition 1 was 80, and the number of test samples in Condition 2 was 400. A NG rate (number of NG samples/number of test samples (80 or 400)) in each Example and each Comparative Example was calculated. The NG rate in Condition 1 (PCBT 24 hours): 0/80 was used as a pass/fail criterion for durability. The lower the NG rate in Condition 2 was, the better the durability was considered to be. The evaluation results of Experiment 1 are shown in Table 1.

TABLE 1

| Sample No. | Segregations Existing in Grain Boundary Phases | | Evaluation Results of PCBT | |
|---|---|---|---|---|
| | | | Condition 1: 24 hours | Condition 2: 240 hours |
| | Composition Type | Molar Ratio MR Al/(Al + Si) | NG Rate (NG Number/Test Number) | NG Rate (NG Number/Test Number) |
| Comp. Ex. 1 | — | — | 2/80 | 15/400 |
| Comp. Ex. 2 | *Al-O* | 1.00 | 1/80 | 7/400 |
| Comp. Ex. 3 | *Si-O* | 0.00 | 3/80 | 18/400 |
| Comp. Ex. 4 | Al—Si—O | *0.80* | 2/80 | 13/400 |
| Comp. Ex. 5 | Al—Si—O | *0.77* | 1/80 | 8/400 |
| Ex. 1 | Al—Si—O | 0.75 | 0/80 | 2/400 |
| Ex. 2 | Al—Si—O | 0.67 | 0/80 | 3/400 |
| Ex. 3 | Ba—Al—Si—O | 0.67 | 0/80 | 0/400 |
| Ex. 4 | Ba—Al—Si—O | 0.61 | 0/80 | 0/400 |
| Ex. 5 | Ba—Al—Si—O | 0.50 | 0/80 | 1/400 |
| Comp. Ex. 6 | Ba—Al—Si—O | *0.40* | 2/80 | 11/400 |

As shown in Table 1, in Examples 1-5, the segregations 22 having a molar ratio MR of 0.45-0.75 were formed, and the durability for a high-temperature and high-humidity environment was further improved than in each Comparative Example. In the PCBT (240 h) in Condition 2, the NG rate in Examples 3-5 was lower than that in Examples 1 and 2. This result indicates that the durability for a high-temperature and high-humidity environment was particularly favorable by containing Ba in the segregations 22.

Experiment 2

In Experiment 2, capacitor samples according to Examples 11-14 were obtained by changing the average particle size of segregations 22 and the average thickness of grain boundary phases 21. The average particle size of the segregations 22 was controlled by pulverization conditions in the preparation for the segregation powder, and the average thickness of the grain boundary phases 21 was controlled by the addition amount of the sub-components. Except for the above, the experimental conditions in Experiment 2 were the same as those in Example 1 of Experiment 1, and the same evaluation as in Experiment 1 was performed. The evaluation results of Experiment 2 are shown in Table 2.

TABLE 2

| Sample No. | Segregations Existing in Grain Boundary Phases | | Average Particle Size μm | Average Thickness of Grain Boundary Phases μm | Evaluation Results of PCBT | |
|---|---|---|---|---|---|---|
| | | | | | Condition 1: 24 hours | Condition 2: 240 hours |
| | Composition Type | Molar Ratio MR Al/(Al + Si) | | | NG Rate (NG Number/Test Number) | NG Rate (NG Number/Test Number) |
| Ex. 11 | Ba—Al—Si—O | 0.64 | *0.01* | *0.006* | 0/80 | 2/400 |
| Ex. 12 | Ba—Al—Si—O | 0.74 | 0.06 | 0.012 | 0/80 | 0/400 |
| Ex. 13 | Ba—Al—Si—O | 0.69 | 0.19 | 0.140 | 0/80 | 0/400 |
| Ex. 14 | Ba—Al—Si—O | 0.69 | *0.32* | *0.180* | 0/80 | 1/400 |

15

The results shown in Table 2 indicate that it was preferable for the segregations 22 to have an average particle size of 0.05 μm or more and 0.20 μm or less.

Experiment 3

In Experiment 3, capacitor samples according to Examples 21-24 were manufactured by changing the content rate of segregations 22 (the number N of segregations 22 contained in a unit cross section of the ceramic layers 10). The number N was controlled by the addition amount of the segregation powder in the dielectric paste. Except for the above, the experimental conditions in Experiment 3 were the same as those in Example 1 of Experiment 1, and the same evaluation as in Experiment 1 was performed.

In Experiment 3, a relative permittivity of each capacitor sample was also measured. The relative permittivity was calculated by measuring a capacitance using an LCR meter (manufactured by KEYSIGT ECHNOLOGIES: E4981A capacitance meter). Specifically, in the measurement of the capacitance, the measurement temperature was 20° C., and a signal having a frequency of 1 kHz and an input signal level (measurement voltage) of 1 Vrms was input to the capacitor samples. Then, the relative permittivity (no unit) was calculated based on the thickness of each dielectric layer, the effective electrode area, and the measured capacitance. The above-mentioned measurement was performed on 10 samples for each example, and an average value was calculated. In the present examples, a relative permittivity of 2500 or more was considered to be good. The evaluation results of Experiment 3 are shown in Table 3.

16

4b . . . side surface
10 . . . ceramic layer
12 . . . internal electrode layer
20 . . . dielectric particle
21 . . . grain boundary phase
21a . . . grain boundary multipoint
21b . . . two-particle grain boundary
22 . . . segregation
6 . . . external electrode

What is claimed is:

1. A dielectric composition comprising:
dielectric particles each including a perovskite compound represented by $ABO_3$ as a main component;
grain boundary phases located between the dielectric particles; and
segregations existing in a part of the grain boundary phases and including at least Al, Si, and O,
wherein a molar ratio (Al/(Al+Si)) of an Al content to a total content of Al and Si in the segregations is 0.60 or more and 0.75 or less,
wherein the segregations further include Ba and Ti, and
wherein a Ba/Ti ratio in the segregations is 1.20 or more.

2. The dielectric composition according to claim 1, wherein
a Ba/Ti ratio in the segregations is larger than that in the dielectric particles.

3. The dielectric composition according to claim 1, wherein an average particle size of the segregations is 0.05 μm or more and 0.20 μm or less.

TABLE 3

| | | Segregations Existing in | | Evaluation Results of PCBT | | |
| | | Grain Boundary Phases | | Condition 1: | Condition 2: | |
| Sample No. | Composition Type | Molar Ratio MR Al/(Al + Si) | Content Rate (Number N) pieces/μm² | 24 hours NG Number/ Test Number | 240 hours NG Number/ Test Number | Relative Permittivity — |
|---|---|---|---|---|---|---|
| Ex. 21 | Ba—Al—Si—O | 0.60 | *0.01* | 0/80 | 2/400 | 2562 |
| Ex. 22 | Ba—Al—Si—O | 0.73 | 0.06 | 0/80 | 0/400 | 2696 |
| Ex. 23 | Ba—Al—Si—O | 0.62 | 1.90 | 0/80 | 0/400 | 2593 |
| Ex. 24 | Ba—Al—Si—O | 0.72 | *3.20* | 0/80 | 0/400 | 2263 |

The results shown in Table 3 indicate that the number N was preferably 0.05 pieces/μm² or more. Considering the influence on the relative permittivity, the number N was preferably 2.0 pieces/μm² or less.

DESCRIPTION OF THE REFERENCE NUMERICAL

2 . . . multilayer ceramic capacitor
4 . . . element body
4a . . . end surface 4. The dielectric composition according to claim 1, wherein an average thickness of the grain boundary phases is 0.01 μm or more and 0.15 μm or less.

5. The dielectric composition according to claim 1, wherein a content rate of the segregations is 0.05 pieces/μm² or more and 2.00 pieces/μm² or less.

6. The dielectric composition according to claim 1, wherein the perovskite compound comprises barium titanate.

7. A multilayer ceramic electronic device comprising the dielectric composition according to claim 1.

* * * * *